(12) United States Patent
Kim et al.

(10) Patent No.: US 10,410,352 B1
(45) Date of Patent: Sep. 10, 2019

(54) LEARNING METHOD AND LEARNING DEVICE FOR IMPROVING SEGMENTATION PERFORMANCE TO BE USED FOR DETECTING EVENTS INCLUDING PEDESTRIAN EVENT, VEHICLE EVENT, FALLING EVENT AND FALLEN EVENT USING EDGE LOSS AND TEST METHOD AND TEST DEVICE USING THE SAME

(71) Applicant: Stradvision, Inc., Pohang, Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Pohang-si (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Pohang-si (KR); Hongmo Je, Pohang-si (KR); Hojin Cho, Gyeongsangbuk-do (KR)

(73) Assignee: Stradvision, Inc., Pohang, Gyeongbuk (KR)

( * ) Notice: Subject to any disclaimer, the term of this patent is extended or adjusted under 35 U.S.C. 154(b) by 0 days.

(21) Appl. No.: 16/257,832

(22) Filed: Jan. 25, 2019

(51) Int. Cl.
*G06T 7/12* (2017.01)
*G06T 7/13* (2017.01)
(Continued)

(52) U.S. Cl.
CPC .............. *G06T 7/12* (2017.01); *G06K 9/6232* (2013.01); *G06K 9/6256* (2013.01);
(Continued)

(58) Field of Classification Search
CPC .. G06K 9/6257; G06K 9/4642; G06K 9/6262; G06N 3/04; G06N 7/005
See application file for complete search history.

(56) References Cited

U.S. PATENT DOCUMENTS 9,547,908 B1 * 1/2017 Kim ........................... G06T 5/20
10,157,441 B2 * 12/2018 Chang ................... G06K 9/628
(Continued)

*Primary Examiner* — Utpal D Shah
(74) *Attorney, Agent, or Firm* — Kaplan Breyer Schwarz, LLP

(57) ABSTRACT

A learning method for improving a segmentation performance to be used for detecting events including a pedestrian event, a vehicle event, a falling event, and a fallen event using a learning device is provided. The method includes steps of: the learning device (a) instructing k convolutional layers to generate k encoded feature maps; (b) instructing k−1 deconvolutional layers to sequentially generate k−1 decoded feature maps, wherein the learning device instructs h mask layers to refer to h original decoded feature maps outputted from h deconvolutional layers corresponding thereto and h edge feature maps generated by extracting edge parts from the h original decoded feature maps; and (c) instructing h edge loss layers to generate h edge losses by referring to the edge parts and their corresponding GTs. Further, the method allows a degree of detecting traffic sign, landmark, road marker, and the like to be increased.

30 Claims, 7 Drawing Sheets

(51) Int. Cl.
  *G06K 9/62* (2006.01)
  *G06N 3/08* (2006.01)
  *G06N 20/00* (2019.01)

(52) U.S. Cl.
  CPC ............ *G06K 9/6262* (2013.01); *G06N 3/08* (2013.01); *G06N 20/00* (2019.01); *G06T 7/13* (2017.01); *G06T 2207/20081* (2013.01); *G06T 2207/30252* (2013.01)

(56) References Cited

U.S. PATENT DOCUMENTS

| | | | | |
|---|---|---|---|---|
| 10,223,610 | B1* | 3/2019 | Akselrod-Ballin | ........................ G06K 9/6218 |
| 10,229,346 | B1* | 3/2019 | Kim | ............... G06K 9/6262 |
| 10,304,193 | B1* | 5/2019 | Wang | ................ G06T 7/11 |
| 2012/0134579 | A1* | 5/2012 | Kameyama | .......... G06T 3/4053 382/159 |
| 2016/0358337 | A1* | 12/2016 | Dai | ..................... G06T 5/10 |
| 2017/0206434 | A1* | 7/2017 | Nariyambut Murali | ................ G06K 9/628 |
| 2017/0287137 | A1* | 10/2017 | Lin | ..................... G06K 9/66 |
| 2017/0309021 | A1* | 10/2017 | Barnes | ............... G06T 7/0012 |
| 2018/0108137 | A1* | 4/2018 | Price | ..................... G06T 7/11 |
| 2018/0116620 | A1* | 5/2018 | Chen | ................... A61B 6/03 |
| 2018/0122114 | A1* | 5/2018 | Luan | ................. G06T 7/194 |
| 2018/0211620 | A1* | 7/2018 | Kurokawa | ........... G09G 3/3688 |
| 2018/0259608 | A1* | 9/2018 | Golden | .............. G01R 33/5608 |
| 2018/0260793 | A1* | 9/2018 | Li | ..................... G06Q 10/20 |
| 2018/0285695 | A1* | 10/2018 | Guo | ..................... A61B 5/055 |
| 2018/0300564 | A1* | 10/2018 | Kwant | ............... G06K 9/00818 |
| 2018/0300624 | A1* | 10/2018 | El-Khamy | ............... G06N 3/08 |
| 2018/0307980 | A1* | 10/2018 | Barik | ................. G06N 3/0445 |
| 2019/0026917 | A1* | 1/2019 | Liao | ..................... G06T 7/73 |
| 2019/0035101 | A1* | 1/2019 | Kwant | ..................... G06T 7/60 |
| 2019/0049540 | A1* | 2/2019 | Odry | ..................... G01R 33/543 |
| 2019/0050981 | A1* | 2/2019 | Song | ................ G06T 7/0012 |
| 2019/0065817 | A1* | 2/2019 | Mesmakhosroshahi | ..................... G06K 9/0014 |
| 2019/0079999 | A1* | 3/2019 | Min | ..................... G06F 16/335 |
| 2019/0080456 | A1* | 3/2019 | Song | ................ G06T 7/143 |
| 2019/0147284 | A1* | 5/2019 | Gavrilyuk | ............ G06K 9/3241 |
| 2019/0156144 | A1* | 5/2019 | Li | ..................... G06K 9/629 |

* cited by examiner

US 10,410,352 B1

LEARNING METHOD AND LEARNING DEVICE FOR IMPROVING SEGMENTATION PERFORMANCE TO BE USED FOR DETECTING EVENTS INCLUDING PEDESTRIAN EVENT, VEHICLE EVENT, FALLING EVENT AND FALLEN EVENT USING EDGE LOSS AND TEST METHOD AND TEST DEVICE USING THE SAME

FIELD OF THE DISCLOSURE

The present disclosure relates to a learning method, a learning device, a testing method and a testing device for use with an autonomous vehicle; and more particularly, to the learning method and the learning device for improving a segmentation performance using an edge loss, and the testing method and the testing device using the same.

BACKGROUND OF THE DISCLOSURE

Deep learning is a technology used to cluster or classify objects or data. For example, computers cannot distinguish dogs and cats from photographs only. But a human can easily distinguish those two. To this end, a method called "machine learning" was devised. It is a technique to allow a computer to classify similar things among lots of data inputted thereto. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are at the heart of the remarkable development in deep learning. CNNs have already been used in the 90's to solve the problems of character recognition, but their use has become as widespread as it is now thanks to recent research. These deep CNNs won the 2012 ImageNet image classification tournament, crushing other competitors. Then, the convolution neural network became a very useful tool in the field of the machine learning.

Image segmentation is a method of generating at least one label image by using at least one input image. As the deep learning has recently become popular, the segmentation is also performed by using the deep learning. The segmentation had been performed with methods using only an encoder, such as a method for generating the label image by one or more convolution operations. Thereafter, the segmentation has been performed with methods using an encoder-decoder configuration for extracting features of the image by the encoder and restoring them as the label image by the decoder.

FIG. 1 is a drawing schematically illustrating a process of a conventional segmentation by using a CNN.

By referring to FIG. 1, according to a conventional lane detection method, a learning device receives an input image, instructs one or more multiple convolutional layers to generate at least one feature map by applying the convolution operations and one or more non-linear operations, e.g., ReLU, to the input image, and then generates a segmentation result by instructing one or more deconvolutional layers to apply one or more deconvolution operations and SoftMax operations to the feature maps.

However, there is a problem that many of edge parts are missed in the process of encoding and decoding the input image as illustrated in FIG. 1. Recently, a network called U-Net was developed which uses each information, outputted from each convolutional layer of the encoder, during the process of decoding. But there are still problems that a learning for detecting the edge parts is not performed effectively and that much energy is needed to reconstruct the edge parts.

SUMMARY OF THE DISCLOSURE

It is an object of the present disclosure to solve all the aforementioned problems.

It is another object of the present disclosure to provide a method for reinforcing one or more edge parts on an input image through reducing errors of the edge parts, in order to detect the edge parts more accurately in a process of a segmentation.

It is still another object of the present disclosure to provide a segmentation method for outputting a fine label image.

In accordance with one aspect of the present disclosure, there is provided a learning method for improving a segmentation performance using a learning device, wherein the learning device includes (i) a first to a k-th convolutional layers, which respectively generate a first to a k-th encoded feature maps by applying one or more convolution operations to at least one feature map corresponding to at least one training image, (ii) a (k−1)-th to a first deconvolutional layers, which respectively generate a (k−1)-th to a first decoded feature maps by applying one or more deconvolution operations to the k-th encoded feature map, (iii) a first to an h-th mask layers respectively corresponding to h deconvolutional layers among the (k−1) deconvolutional layers, and (iv) a first to an h-th edge loss layers respectively corresponding to the first to the h-th mask layers, and wherein the h is an integer from 1 to (k−1), including steps of: (a) the learning device, if the training image is inputted, instructing the first to the k-th convolutional layers to generate the first to the k-th encoded feature maps; (b) the learning device instructing the (k−1)-th to the first deconvolutional layers to sequentially generate the (k−1)-th to the first decoded feature maps, wherein the learning device instructs the h-th to the first mask layers to (i) generate an h-th to a first edge feature maps by extracting edge parts from h original decoded feature maps each of which is outputted from each of the h deconvolutional layers corresponding to each of the h-th to the first mask layers, and (ii) generate h edge reinforced decoded feature maps serving as at least part of the (k−1)-th to the first decoded feature maps by referring to the h original decoded feature maps and the h-th to the first edge feature maps; and (c) the learning device instructing the first to the h-th edge loss layers to generate a first to an h-th edge losses by referring to the edge parts and their corresponding GTs (ground truths), to thereby adjust one or more parameters of at least part of the first to the (k−1)-th deconvolutional layers and the k-th to the first convolutional layers through backpropagation by using the first to the h-th edge losses.

As one example, the first to the h-th edge loss layers generate the first to the h-th edge losses by calculating differences between the edge parts and their corresponding GTs, wherein the GTs are respectively extracted from a first to an h-th GT images whose sizes correspond respectively to sizes of the first to the h-th edge feature maps.

As one example, at the step of (b), the (k−1)-th to the first deconvolutional layers sequentially generate the (k−1)-th to the first decoded feature maps (i) by element-wise adding each of the h-th to the first edge feature maps and each of the h original decoded feature maps outputted from the h deconvolutional layers corresponding to the h-th to the first mask layers and (ii) by generating k−h original decoded feature maps serving as at least part of the k−1 decoded feature maps via applying the deconvolution operations to feature maps from each previous layer of each of k−h deconvolutional layers, which do not correspond to the h-th to the first mask layers.

As one example, the learning device further includes (v) a first to an r-th loss layers located corresponding to r deconvolutional layers among the first to the (k−1)-th deconvolutional layers, wherein the step of (c) includes a step of: (c1) the learning device instructing the first to the r-th loss layers to generate a first to an r-th losses respectively by referring to each of r decoded feature maps, outputted from the r deconvolutional layers corresponding to the first to the r-th loss layers, and its corresponding GT image, to thereby adjust the parameters of at least part of the first to the (k−1)-th deconvolutional layers and the k-th to the first convolutional layers through backpropagation by using the first to the r-th losses.

As one example, the first to the r-th loss layers respectively calculate the first to the r-th losses by referring to each of r converted feature maps, generated by applying each of auxiliary convolution operations to each of the r decoded feature maps, and its corresponding GT image, to thereby generate the first to the r-th losses.

As one example, the learning device further includes (vi) a first to an h-th intermediate layers each of which is located between each output end of the first to the h-th mask layers and each output end of their corresponding convolutional layers; wherein the step of (b) includes steps of: (b1) the learning device instructing the first to the h-th intermediate layers to generate a first to an h-th intermediate feature maps by inputting h encoded feature maps thereto which are outputted from h convolutional layers corresponding to the first to the h-th mask layers; (b2) the learning device instructing the first to the h-th mask layers to generate the first to the h-th edge feature maps by extracting the edge parts from the h original decoded feature maps each of which is outputted from each of the h deconvolutional layers corresponding to each of the first to the h-th mask layers; and (b3) the learning device (i) instructing a first to an h-th element-wise product layers to generate each of a first to an h-th element-wise products through element-wise multiplying each of the first to the h-th intermediate feature maps and its corresponding edge feature map and (ii) instructing a first to an h-th element-wise summing layers to element-wise add each of the first to the h-th element-wise products and its corresponding original decoded feature map among the h original decoded feature maps, to thereby generate h decoded feature maps among the first to the (k−1)-th decoded feature maps.

As one example, the learning device further includes an additional (h+1)-th intermediate layer between an output end of the k-th convolutional layer and an input end of the (k−1)-th deconvolutional layer, and wherein the additional (h+1)-th intermediate layer generates an (h+1)-th intermediate feature map by applying one or more intermediate operations to the k-th encoded feature maps and forwards the (h+1)-th intermediate feature map to the (k−1)-th deconvolutional layer.

As one example, at least one of the first to the h-th intermediate layers performs one or more dilated convolution operations.

As one example, at the step of (b2), the learning device instructs at least an m-th mask layer among the first to the h-th mask layers to generate an m-th edge feature map by extracting edge parts from an n-th original decoded feature map outputted from an n-th deconvolutional layer, corresponding to the m-th mask layer, among the k−1 deconvolutional layers, and, at the step of (b3), the learning device (i) instructs an m-th element-wise product layer to generate an m-th element-wise product through element-wise multiplying the m-th edge feature map and an m-th intermediate feature map, outputted from an m-th intermediate layer corresponding to the m-th mask layer, and (ii) instructs an m-th element-wise summing layer to element-wise add the m-th element-wise product and the n-th original decoded feature map, to generate an n-th decoded feature map.

As one example, the learning device further includes (v) a first to an r-th loss layers located corresponding to r deconvolutional layers among the first to the (k−1)-th deconvolutional layers, wherein the learning device further includes an additional deconvolutional layer capable of receiving the first decoded feature map and outputting an adjusted first decoded feature map, to be inputted to the first loss layer, and wherein the step of (c) includes a step of: (c1) the learning device instructing the first to the r-th loss layers to generate a first to an r-th losses respectively by referring to each of r decoded feature maps, outputted from the r deconvolutional layers corresponding to the first to the r-th loss layers, and its corresponding GT image, to thereby adjust the parameters of at least part of the first to the (k−1)-th deconvolutional layers and the k-th to the first convolutional layers through backpropagation by using the first to the r-th losses.

In accordance with another aspect of the present disclosure, there is provided a testing method for a segmentation of at least one test image including steps of: (a) on condition that, assuming that a learning device includes (i) a first to a k-th convolutional layers, which respectively generate a first to a k-th encoded feature maps for training by applying one or more convolution operations to at least one feature map corresponding to at least one training image, (ii) a (k−1)-th to a first deconvolutional layers, which respectively generate a (k−1)-th to a first decoded feature maps for training by applying one or more deconvolution operations to the k-th encoded feature map for training, (iii) a first to an h-th mask layers respectively corresponding to h deconvolutional layers among the (k−1) deconvolutional layers, and (iv) a first to an h-th edge loss layers respectively corresponding to the first to the h-th mask layers, and wherein the h is an integer from 1 to (k−1), the learning device (1) has instructed the first to the k-th convolutional layers to generate the first to the k-th encoded feature maps for training, (2) has instructed the (k−1)-th to the first deconvolutional layers to sequentially generate the (k−1)-th to the first decoded feature maps for training, wherein the learning device has instructed the h-th to the first mask layers to (i) generate an h-th to a first edge feature maps for training by extracting edge parts for training from h original decoded feature maps for training each of which is outputted from each of the h deconvolutional layers corresponding to each of the h-th to the first mask layers, and (ii) generate h edge reinforced decoded feature maps for training serving as at least part of the (k−1)-th to the first decoded feature maps for training by referring to the h original decoded feature maps for training and the h-th to the first edge feature maps for training, and (3) has instructed the first to the h-th edge loss layers to generate a first to an h-th edge losses by referring to the edge parts for training and their corresponding GTs (ground truths), to thereby adjust one or more parameters of at least part of the first to the (k−1)-th deconvolutional layers and the k-th to the first convolutional layers through backpropagation by using the first to the h-th edge losses; a testing device, if the test image is inputted, instructing the first to the k-th convolutional layers to generate a first to a k-th encoded feature maps for testing; and (b) the testing device instructing the (k−1)-th to the first deconvolutional layers to sequentially generate a (k−1)-th to a first decoded feature maps for testing, wherein the testing device instructs the h-th to the first mask layers to (i) generate an h-th to a first edge feature maps for testing by extracting edge parts for testing from h original decoded feature maps for testing each of which is outputted from each of the h deconvolutional layers corresponding to each of the h-th to the first mask layers, and (ii) generate h edge reinforced decoded feature maps for testing serving as at least part of the (k−1)-th to the first decoded feature maps for testing by referring to the h original decoded feature maps for testing and the h-th to the first edge feature maps for testing.

As one example, at the step of (b), the (k−1)-th to the first deconvolutional layers sequentially generate the (k−1)-th to the first decoded feature maps for testing (i) by element-wise adding each of the h-th to the first edge feature maps for testing and each of the h original decoded feature maps for testing outputted from the h deconvolutional layers corresponding to the h-th to the first mask layers and (ii) by generating k−h original decoded feature maps for testing serving as at least part of the k−1 decoded feature maps for testing via applying the deconvolution operations to feature maps for testing from each previous layer of each of k−h deconvolutional layers, which do not correspond to the h-th to the first mask layers.

As one example, the testing device further includes (vi) a first to an h-th intermediate layers each of which is located between each output end of the first to the h-th mask layers and each output end of their corresponding convolutional layers; wherein the step of (b) includes steps of: (b1) the testing device instructing the first to the h-th intermediate layers to generate a first to an h-th intermediate feature maps for testing by inputting h encoded feature maps for testing thereto which are outputted from h convolutional layers corresponding to the first to the h-th mask layers; (b2) the testing device instructing the first to the h-th mask layers to generate the first to the h-th edge feature maps for testing by extracting the edge parts for testing from the h original decoded feature maps for testing each of which is outputted from each of the h deconvolutional layers corresponding to each of the first to the h-th mask layers; and (b3) the testing device (i) instructing a first to an h-th element-wise product layers to generate each of a first to an h-th element-wise products for testing through element-wise multiplying each of the first to the h-th intermediate feature maps for testing and its corresponding edge feature map for testing and (ii) instructing a first to an h-th element-wise summing layers to element-wise add each of the first to the h-th element-wise products for testing and its corresponding original decoded feature map for testing among the h original decoded feature maps for testing, to thereby generate h decoded feature maps for testing among the first to the (k−1)-th decoded feature maps for testing.

As one example, the testing device further includes an additional (h+1)-th intermediate layer between an output end of the k-th convolutional layer and an input end of the (k−1)-th deconvolutional layer, and wherein the additional (h+1)-th intermediate layer generates an (h+1)-th intermediate feature map for testing by applying one or more intermediate operations to the k-th encoded feature maps for testing and forwards the (h+1)-th intermediate feature map for testing to the (k−1)-th deconvolutional layer.

As one example, at the step of (b2), the testing device instructs at least an m-th mask layer among the first to the h-th mask layers to generate an m-th edge feature map for testing by extracting edge parts for testing from an n-th original decoded feature map for testing outputted from an n-th deconvolutional layer, corresponding to the m-th mask layer, among the k−1 deconvolutional layers, and, at the step of (b3), the testing device (i) instructs an m-th element-wise product layer to generate an m-th element-wise product for testing through element-wise multiplying the m-th edge feature map for testing and an m-th intermediate feature map for testing, outputted from an m-th intermediate layer corresponding to the m-th mask layer, and (ii) instructs an m-th element-wise summing layer to element-wise add the m-th element-wise product for testing and the n-th original decoded feature map for testing, to generate an n-th decoded feature map for testing.

In accordance with still another aspect of the present disclosure, there is provided a learning device for improving a segmentation performance, wherein the learning device includes (i) a first to a k-th convolutional layers, which respectively generate a first to a k-th encoded feature maps by applying one or more convolution operations to at least one feature map corresponding to at least one training image, (ii) a (k−1)-th to a first deconvolutional layers, which respectively generate a (k−1)-th to a first decoded feature maps by applying one or more deconvolution operations to the k-th encoded feature map, (iii) a first to an h-th mask layers respectively corresponding to h deconvolutional layers among the (k−1) deconvolutional layers, and (iv) a first to an h-th edge loss layers respectively corresponding to the first to the h-th mask layers, and wherein the h is an integer from 1 to (k−1), including: at least one memory that stores instructions; and at least one processor configured to execute the instructions to: perform processes of (I) instructing the first to the k-th convolutional layers to generate the first to the k-th encoded feature maps, (II) instructing the (k−1)-th to the first deconvolutional layers to sequentially generate the (k−1)-th to the first decoded feature maps, wherein the processor instructs the h-th to the first mask layers to (i) generate an h-th to a first edge feature maps by extracting edge parts from h original decoded feature maps each of which is outputted from each of the h deconvolutional layers corresponding to each of the h-th to the first mask layers, and (ii) generate h edge reinforced decoded feature maps serving as at least part of the (k−1)-th to the first decoded feature maps by referring to the h original decoded feature maps and the h-th to the first edge feature maps, and (III) instructing the first to the h-th edge loss layers to generate a first to an h-th edge losses by referring to the edge parts and their corresponding GTs (ground truths), to thereby adjust one or more parameters of at least part of the first to the (k−1)-th deconvolutional layers and the k-th to the first convolutional layers through backpropagation by using the first to the h-th edge losses.

As one example, the first to the h-th edge loss layers generate the first to the h-th edge losses by calculating differences between the edge parts and their corresponding GTs, wherein the GTs are respectively extracted from a first to an h-th GT images whose sizes correspond respectively to sizes of the first to the h-th edge feature maps.

As one example, at the process of (II), the (k−1)-th to the first deconvolutional layers sequentially generate the (k−1)-th to the first decoded feature maps (i) by element-wise adding each of the h-th to the first edge feature maps and each of the h original decoded feature maps outputted from the h deconvolutional layers corresponding to the h-th to the first mask layers and (ii) by generating k−h original decoded feature maps serving as at least part of the k−1 decoded feature maps via applying the deconvolution operations to feature maps from each previous layer of each of k−h deconvolutional layers, which do not correspond to the h-th to the first mask layers.

As one example, the learning device further includes (v) a first to an r-th loss layers located corresponding to r deconvolutional layers among the first to the (k−1)-th deconvolutional layers, wherein the process of (III) includes a process of: (III-1) the processor instructing the first to the r-th loss layers to generate a first to an r-th losses respectively by referring to each of r decoded feature maps, outputted from the r deconvolutional layers corresponding to the first to the r-th loss layers, and its corresponding GT image, to thereby adjust the parameters of at least part of the first to the (k−1)-th deconvolutional layers and the k-th to the first convolutional layers through backpropagation by using the first to the r-th losses.

As one example, the first to the r-th loss layers respectively calculate the first to the r-th losses by referring to each of r converted feature maps, generated by applying each of auxiliary convolution operations to each of the r decoded feature maps, and its corresponding GT image, to thereby generate the first to the r-th losses.

As one example, the learning device further includes (vi) a first to an h-th intermediate layers each of which is located between each output end of the first to the h-th mask layers and each output end of their corresponding convolutional layers; wherein the process of (II) includes processes of: (II-1) the processor instructing the first to the h-th intermediate layers to generate a first to an h-th intermediate feature maps by inputting h encoded feature maps thereto which are outputted from h convolutional layers corresponding to the first to the h-th mask layers; (II-2) the processor instructing the first to the h-th mask layers to generate the first to the h-th edge feature maps by extracting the edge parts from the h original decoded feature maps each of which is outputted from each of the h deconvolutional layers corresponding to each of the first to the h-th mask layers; and (II-3) the processor (i) instructing a first to an h-th element-wise product layers to generate each of a first to an h-th element-wise products through element-wise multiplying each of the first to the h-th intermediate feature maps and its corresponding edge feature map and (ii) instructing a first to an h-th element-wise summing layers to element-wise add each of the first to the h-th element-wise products and its corresponding original decoded feature map among the h original decoded feature maps, to thereby generate h decoded feature maps among the first to the (k−1)-th decoded feature maps.

As one example, the learning device further includes an additional (h+1)-th intermediate layer between an output end of the k-th convolutional layer and an input end of the (k−1)-th deconvolutional layer, and wherein the additional (h+1)-th intermediate layer generates an (h+1)-th intermediate feature map by applying one or more intermediate operations to the k-th encoded feature maps and forwards the (h+1)-th intermediate feature map to the (k−1)-th deconvolutional layer.

As one example, at least one of the first to the h-th intermediate layers performs one or more dilated convolution operations.

As one example, at the process of (II-2), the processor instructs at least an m-th mask layer among the first to the h-th mask layers to generate an m-th edge feature map by extracting edge parts from an n-th original decoded feature map outputted from an n-th deconvolutional layer, corresponding to the m-th mask layer, among the k−1 deconvolutional layers, and, at the process of (II-3), the processor (i) instructs an m-th element-wise product layer to generate an m-th element-wise product through element-wise multiplying the m-th edge feature map and an m-th intermediate feature map, outputted from an m-th intermediate layer corresponding to the m-th mask layer, and (ii) instructs an m-th element-wise summing layer to element-wise add the m-th element-wise product and the n-th original decoded feature map, to generate an n-th decoded feature map.

As one example, the learning device further includes (v) a first to an r-th loss layers located corresponding to r deconvolutional layers among the first to the (k−1)-th deconvolutional layers, wherein the learning device further includes an additional deconvolutional layer capable of receiving the first decoded feature map and outputting an adjusted first decoded feature map, to be inputted to the first loss layer, and wherein the process of (III) includes a process of: (III-1) the processor instructing the first to the r-th loss layers to generate a first to an r-th losses respectively by referring to each of r decoded feature maps, outputted from the r deconvolutional layers corresponding to the first to the r-th loss layers, and its corresponding GT image, to thereby adjust the parameters of at least part of the first to the (k−1)-th deconvolutional layers and the k-th to the first convolutional layers through backpropagation by using the first to the r-th losses.

In accordance with still yet another aspect of the present disclosure, there is provided a testing device for a segmentation of at least one test image including: at least one memory that stores instructions; and at least one processor, on condition that, assuming that a learning device includes (i) a first to a k-th convolutional layers, which respectively generate a first to a k-th encoded feature maps for training by applying one or more convolution operations to at least one feature map corresponding to at least one training image, (ii) a (k−1)-th to a first deconvolutional layers, which respectively generate a (k−1)-th to a first decoded feature maps for training by applying one or more deconvolution operations to the k-th encoded feature map for training, (iii) a first to an h-th mask layers respectively corresponding to h deconvolutional layers among the (k−1) deconvolutional layers, and (iv) a first to an h-th edge loss layers respectively corresponding to the first to the h-th mask layers, and wherein the h is an integer from 1 to (k−1), the learning device (1) has instructed the first to the k-th convolutional layers to generate the first to the k-th encoded feature maps for training, (2) has instructed the (k−1)-th to the first deconvolutional layers to sequentially generate the (k−1)-th to the first decoded feature maps for training, wherein the learning device has instructed the h-th to the first mask layers to (i) generate an h-th to a first edge feature maps for training by extracting edge parts for training from h original decoded feature maps for training each of which is outputted from each of the h deconvolutional layers corresponding to each of the h-th to the first mask layers, and (ii) generate h edge reinforced decoded feature maps for training serving as at least part of the (k−1)-th to the first decoded feature maps for training by referring to the h original decoded feature maps for training and the h-th to the first edge feature maps for training, and (3) has instructed the first to the h-th edge loss layers to generate a first to an h-th edge losses by referring to the edge parts for training and their corresponding GTs (ground truths), to thereby adjust one or more parameters of at least part of the first to the (k−1)-th deconvolutional layers and the k-th to the first convolutional layers through backpropagation by using the first to the h-th edge losses; configured to execute the instructions to: perform processes of (I) instructing the first to the k-th convolutional layers to generate a first to a k-th encoded feature maps for testing, and (II) instructing the (k−1)-th to the first deconvolutional layers to sequentially generate a (k−1)-th to a first decoded feature maps for testing, wherein the processor instructs the h-th to the first mask layers to (i) generate an h-th to a first edge feature maps for testing by extracting edge parts for testing from h original decoded feature maps for testing each of which is outputted from each of the h deconvolutional layers corresponding to each of the h-th to the first mask layers, and (ii) generate h edge reinforced decoded feature maps for testing serving as at least part of the (k−1)-th to the first decoded feature maps for testing by referring to the h original decoded feature maps for testing and the h-th to the first edge feature maps for testing.

As one example, at the process of (II), the (k−1)-th to the first deconvolutional layers sequentially generate the (k−1)-th to the first decoded feature maps for testing (i) by element-wise adding each of the h-th to the first edge feature maps for testing and each of the h original decoded feature maps for testing outputted from the h deconvolutional layers corresponding to the h-th to the first mask layers and (ii) by generating k−h original decoded feature maps for testing serving as at least part of the k−1 decoded feature maps for testing via applying the deconvolution operations to feature maps for testing from each previous layer of each of k−h deconvolutional layers, which do not correspond to the h-th to the first mask layers.

As one example, the testing device further includes (vi) a first to an h-th intermediate layers each of which is located between each output end of the first to the h-th mask layers and each output end of their corresponding convolutional layers; wherein the process of (II) includes processes of: (II-1) the processor instructing the first to the h-th intermediate layers to generate a first to an h-th intermediate feature maps for testing by inputting h encoded feature maps for testing thereto which are outputted from h convolutional layers corresponding to the first to the h-th mask layers; (II-2) the processor instructing the first to the h-th mask layers to generate the first to the h-th edge feature maps for testing by extracting the edge parts for testing from the h original decoded feature maps for testing each of which is outputted from each of the h deconvolutional layers corresponding to each of the first to the h-th mask layers; and (II-3) the processor (i) instructing a first to an h-th element-wise product layers to generate each of a first to an h-th element-wise products for testing through element-wise multiplying each of the first to the h-th intermediate feature maps for testing and its corresponding edge feature map for testing and (ii) instructing a first to an h-th element-wise summing layers to element-wise add each of the first to the h-th element-wise products for testing and its corresponding original decoded feature map for testing among the h original decoded feature maps for testing, to thereby generate h decoded feature maps for testing among the first to the (k−1)-th decoded feature maps for testing.

As one example, the testing device further includes an additional (h+1)-th intermediate layer between an output end of the k-th convolutional layer and an input end of the (k−1)-th deconvolutional layer, and wherein the additional (h+1)-th intermediate layer generates an (h+1)-th intermediate feature map for testing by applying one or more intermediate operations to the k-th encoded feature maps for testing and forwards the (h+1)-th intermediate feature map for testing to the (k−1)-th deconvolutional layer.

As one example, at the process of (II-2), the processor instructs at least an m-th mask layer among the first to the h-th mask layers to generate an m-th edge feature map for testing by extracting edge parts for testing from an n-th original decoded feature map for testing outputted from an n-th deconvolutional layer, corresponding to the m-th mask layer, among the k−1 deconvolutional layers, and, at the process of (II-3), the processor (i) instructs an m-th element-wise product layer to generate an m-th element-wise product for testing through element-wise multiplying the m-th edge feature map for testing and an m-th intermediate feature map for testing, outputted from an m-th intermediate layer corresponding to the m-th mask layer, and (ii) instructs an m-th element-wise summing layer to element-wise add the m-th element-wise product for testing and the n-th original decoded feature map for testing, to generate an n-th decoded feature map for testing.

BRIEF DESCRIPTION OF THE DRAWINGS

The above and other objects and features of the present disclosure will become apparent from the following description of preferred embodiments given in conjunction with the accompanying drawings.

DETAILED DESCRIPTION OF THE PREFERRED EMBODIMENTS

Figure 1:
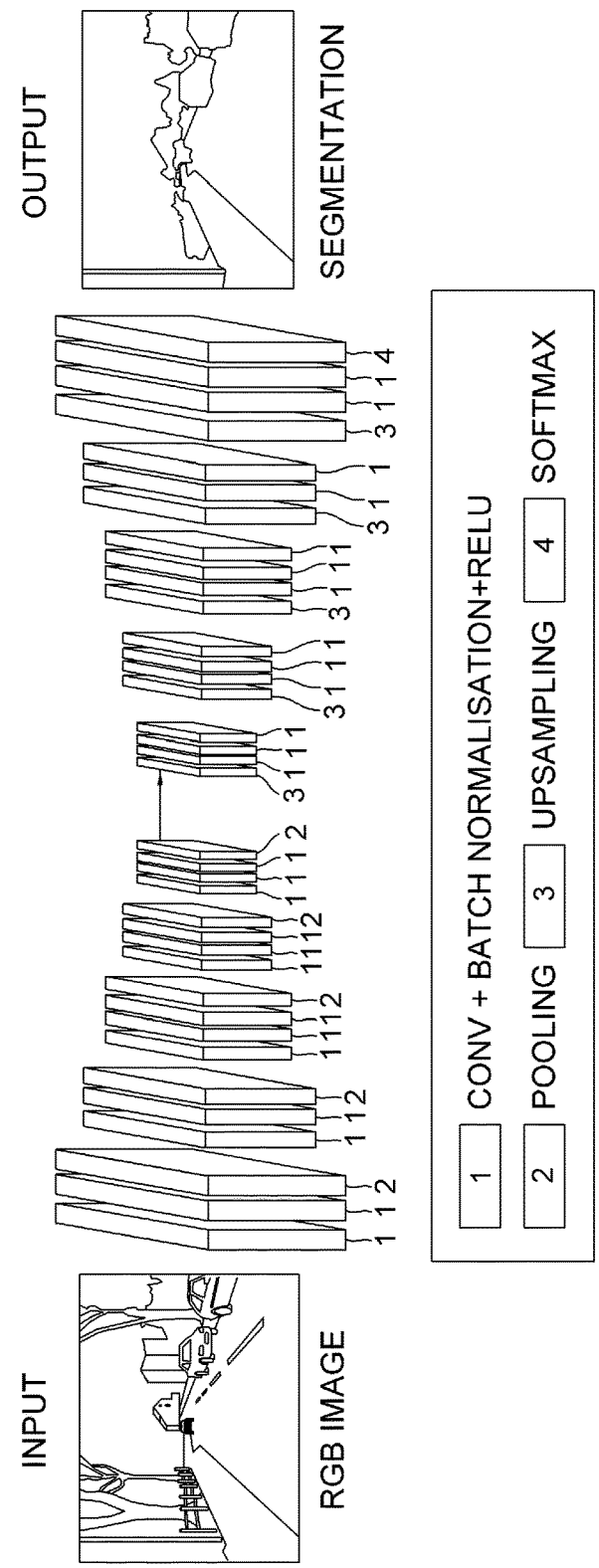
FIG. 1 is a drawing schematically illustrating a process of a conventional segmentation by using a CNN.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

Figure 2:
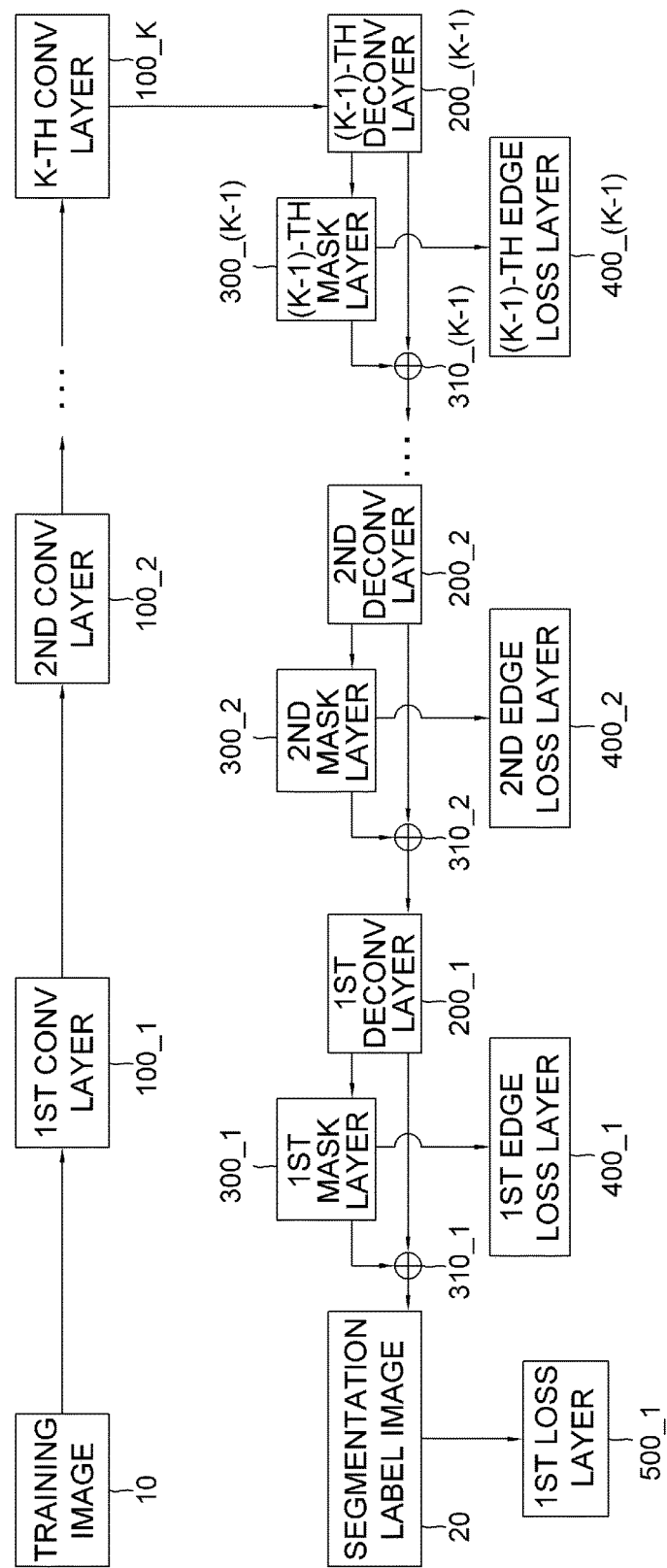
FIG. 2 is a drawing schematically illustrating a process of an image segmentation in accordance with one example embodiment of the present disclosure.

FIG. 2 is a drawing schematically illustrating a process of an image segmentation in accordance with one example embodiment of the present disclosure.

A learning device in accordance with the present disclosure may include a first to a k-th convolutional layers 100_1 to 100_$k$ and a (k−1)-th to a first deconvolutional layers 200_($k$−1) to 200_1 as illustrated in FIG. 2. Further, each of a first to a (k−1)-th mask layers 300_1 to 300_($k$−1) may be connected to each of the first to the (k−1)-th deconvolutional layers 200_1 to 200_($k$−1). In addition, each of a first to a (k−1)-th edge loss layers 400_1 to 400_($k$−1) may be connected to each of the first to the (k−1)-th mask layers 300_1 to 300_($k$−1). Also, each of a first to a (k−1)-th element-wise summing layers 310_1 to 310_($k$−1) may be connected to each of the first to the (k−1)-th mask layers 300_1 to 300_($k$−1) and to each of the first to (k−1)-th deconvolutional layers 200_1 to 200_($k$−1). Herein, the first to the (k−1)-th element-wise summing layers 310_1 to 310_($k$−1) may acquire decoded feature maps from the first to the (k−1)-th deconvolutional layers 200_1 to 200_($k$−1) and edge feature maps from the first to the (k−1)-th mask layers 300_1 to 300_($k$−1) and may forward element-wise sums of the decoded feature maps and the edge feature maps to following deconvolutional layers.

First of all, if at least one training image 10 is inputted, the first to the k-th convolutional layers 100_1 to 100_$k$ may generate a first to a k-th encoded feature maps, and the (k−1)-th to the first deconvolutional layers 200_($k$−1) to 200_1 may generate a (k−1)-th to a first decoded feature maps by applying one or more deconvolution operations to the k-th encoded feature map. Also, a segmentation label image 20 may be generated by applying at least one certain operation to the first decoded feature map.

By referring to FIG. 2, in a process of generating the (k−1)-th to the first decoded feature maps, the learning device may instruct the (k−1)-th to the first mask layers 300_($k$−1) to 300_1 to generate a (k−1)-th to a first edge feature maps by extracting edge parts from a (k−1)-th to a first original decoded feature maps each of which is outputted from each of the (k−1)-th to the first deconvolutional layers and may instruct the (k−1)-th to the first element-wise summing layers 310_($k$−1) to 310_1 to element-wise add each of the (k−1)-th to the first edge feature maps and each of the (k−1)-th to the first original feature maps, to thereby generate the (k−1)-th to the first decoded feature maps, and then the (k−1)-th to a second decoded feature maps may be transmitted to their corresponding next deconvolutional layers.

Next, the learning device may instruct a (k−1)-th to a first edge loss layers 400_($k$−1) to 400_1 to generate a (k−1)-th to a first edge losses by referring to the (k−1)-th to the first edge feature maps, outputted from the (k−1)-th to the first mask layers 300_($k$−1) to 300_1, and their corresponding GTs (ground truths). The first to the (k−1)-th edge losses may be used to adjust one or more parameters of at least part of the first to the (k−1)-th deconvolutional layers and the k-th to the first convolutional layers through backpropagation.

Herein, each of the (k−1)-th to the first edge loss layers 400_($k$−1) to 400_1 may extract edge information from at least one GT label and calculate the (k−1)-th to the first edge losses by referring to the extracted edge information and the (k−1)-th to the first edge feature maps outputted from the (k−1)-th to the first mask layers 300_($k$−1) to 300_1. Thus, the learning may be performed for reinforcing the edge parts by using errors of the edge parts. In case of reconstructing the edge parts, much energy may be needed to reconstruct the edge parts from a small-sized feature map as the edge parts include a wide range of frequencies. Therefore, in a conventional method, the learning process may not be efficient for the edge parts, and accordingly, it may be difficult to output an accurate result in the testing process. However, the method as illustrated in FIG. 2 may improve a performance of a CNN for detecting the edge parts since the edge parts may be reinforced through the edge layers by using the errors of the edge parts.

Herein, the learning device (i) may instruct the first to the k-th convolutional layers 100_1 to 100_$k$ to respectively generate the first to the k-th encoded feature maps by sequentially decreasing sizes of the training image and the first to the (k−1)-th encoded feature maps and by sequentially increasing the number of channels of the training image and the first to the (k−1)-th encoded feature maps, and (ii) may instruct the (k−1)-th to the first deconvolutional layers 200_($k$−1) to 200_1 to respectively generate the (k−1)-th to the first decoded feature maps by sequentially increasing sizes of the k-th encoded feature map and the (k−1)-th to the second decoded feature maps and decreasing the number of channels of the k-th encoded feature map and the (k−1)-th to the second decoded feature maps. Also, the learning device may instruct the (k−1)-th to the first edge loss layers 400_($k$−1) to 400_1 to generate the (k−1)-th to the first edge losses by calculating differences between k−1 edge parts, extracted from the (k−1)-th to the first mask layers 300_(k−1) to 300_1, and their corresponding GT edges, wherein the GT edges are extracted from a (k−1)-th to a first GT images whose sizes correspond respectively to sizes of images of the k−1 edge parts.

Further, the learning device may instruct a first loss layer 500_1 to generate one or more first losses by referring to the first decoded feature map or the segmentation label image 20, and their corresponding GT label image, to thereby adjust the parameters of at least part of the first to the (k−1)-th deconvolutional layers and the k-th to the first convolutional layers through backpropagation by using the first losses.

Moreover, the learning device in accordance with the present disclosure may further include an additional deconvolutional layer capable of receiving the first decoded feature map and outputting an adjusted first decoded feature map, e.g., the segmentation label image 20, to be inputted to the first loss layer.

Meanwhile, the learning device may backpropagate the losses calculated by not only using outputs from the first deconvolutional layers 200_1 but also using a plurality of the decoded feature maps outputted from a plurality of the deconvolutional layers. For example, the learning device may instruct the (k−1)-th to the first loss layers, represented by 500_(k−1) to 500_1 in FIG. 6, corresponding to at least one of the (k−1)-th to the first deconvolutional layers 200_(k−1) to 200_1 to generate one or more losses by referring to at least one decoded feature map, outputted from said at least one of the (k−1)-th to the first deconvolutional layer, and its corresponding GT label image, to thereby backpropagate the losses.

Figure 3:
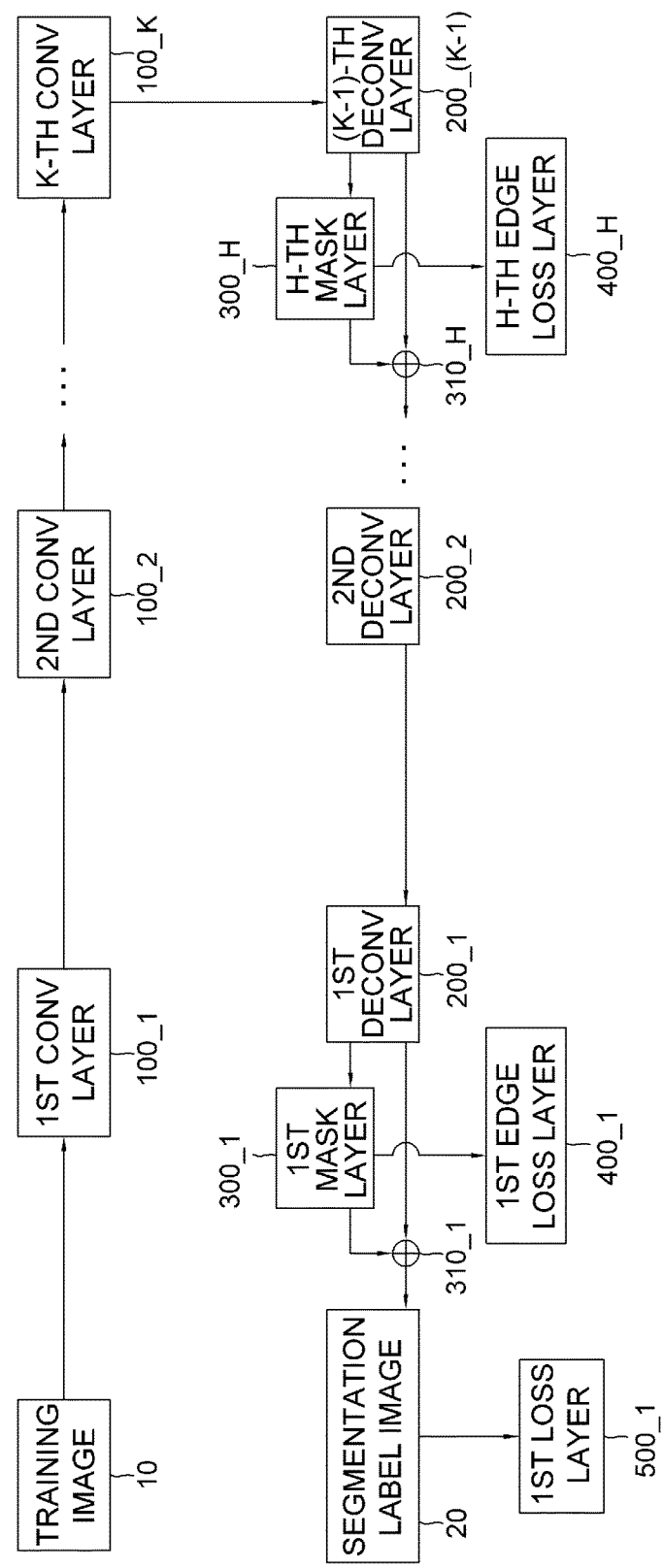
FIG. 3 is a drawing schematically illustrating a process of an image segmentation in accordance with another example embodiment of the present disclosure.

FIG. 3 is a drawing schematically illustrating a process of an image segmentation in accordance with another example embodiment of the present disclosure.

The learning device for improving the segmentation performance illustrated in FIG. 3 in accordance with another example embodiment of the present disclosure may have a basically similar configuration to the learning device illustrated in FIG. 2 in accordance with one example embodiment of the present disclosure, but it may include a first to an h-th mask layers 300_1 to 300_h respectively corresponding to h deconvolutional layers among the (k−1)-th to the first deconvolutional layers 200_(k−1) to 200_1, and a first to an h-th differential layers 400_1 to 400_h respectively corresponding to the first to the h-th mask layers, wherein the h is an integer from 1 to (k−1).

In this case, the learning device in FIG. 3 may instruct the (k−1)-th to the first deconvolutional layers to sequentially generate the (k−1)-th to the first decoded feature maps, wherein the learning device may instruct the h-th to the first mask layers to (i) generate an h-th to a first edge feature maps by extracting edge parts from h original decoded feature maps each of which is outputted from each of the h deconvolutional layers corresponding to each of the h-th to the first mask layers, and (ii) generate h edge reinforced decoded feature maps serving as at least part of the (k−1)-th to the first decoded feature maps by referring to the h original decoded feature maps and the h-th to the first edge feature maps; and maps by referring to the h original decoded feature maps and the h-th to the first edge feature maps. Specifically, the (k−1)-th to the first decoded feature maps may be generated through the (k−1)-th to the first deconvolutional layers (i) by element-wise adding each of the h-th to the first edge feature maps and each of the h original decoded feature maps outputted from the h deconvolutional layers corresponding to the h-th to the first mask layers and (ii) by generating k-h original decoded feature maps serving as at least part of the k−1 decoded feature maps via applying the deconvolution operations to feature maps from each previous layer of each of k-h deconvolutional layers, which do not correspond to the h-th to the first mask layers.

Further, the learning device in FIG. 3 may instruct the first to the h-th edge loss layers to generate a first to an h-th edge losses by referring to the edge parts and their corresponding GTs, to thereby adjust the parameters of at least part of the first to the (k−1)-th deconvolutional layers and the k-th to the first convolutional layers through backpropagation by using the first to the h-th edge losses.

Figure 4:
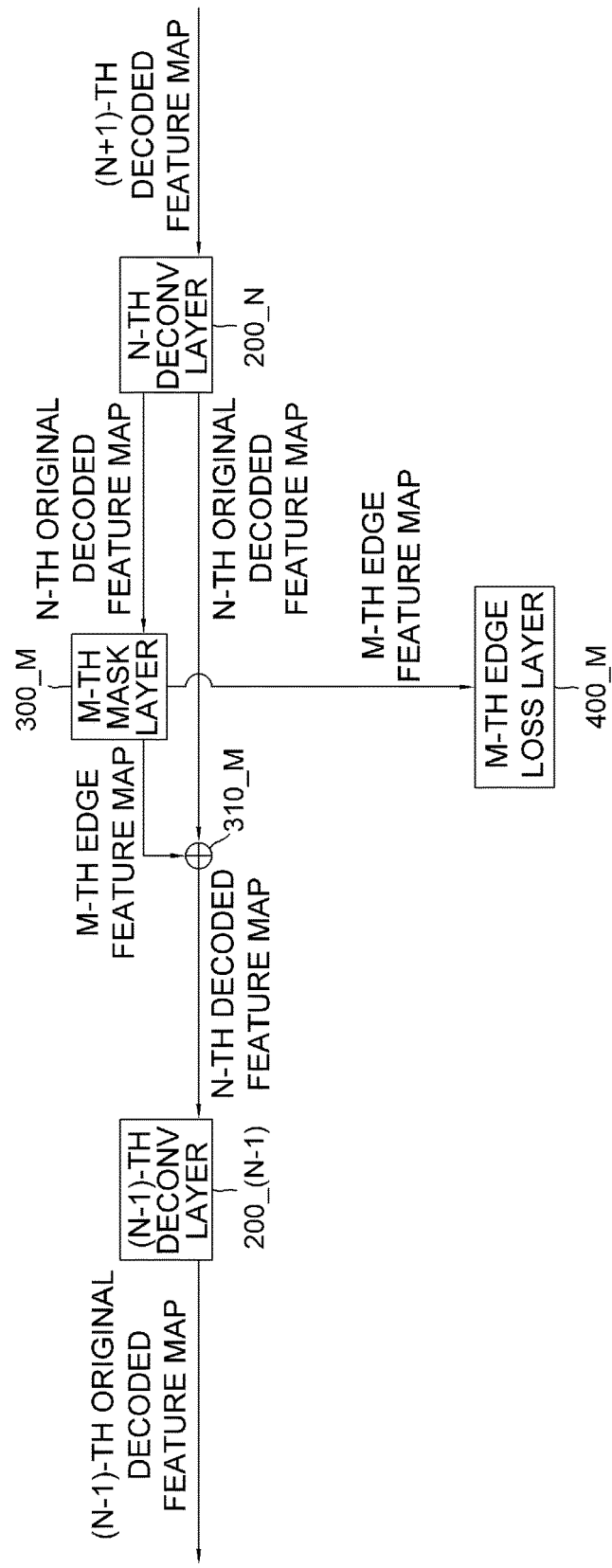
FIG. 4 is a drawing illustrating a detailed process of generating one or more edge losses by extracting edge information in the processes shown in FIGS. 2 and 3.

FIG. 4 is a drawing illustrating a detailed process of generating the edge losses in the process shown in FIGS. 2 and 3 by extracting the edge information.

By referring to FIG. 4, the learning device may instruct an n-th deconvolutional layer 200_n among the (k−1)-th to the first deconvolutional layers 200_(k−1) to 200_1 to generate an n-th original decoded feature map by applying the deconvolution operations to an (n+1)-th decoded feature map transmitted from its previous deconvolutional layer and to generate an n-th decoded feature map by using the n-th original decoded feature map and an m-th edge feature map extracted from the n-th original decoded feature map. FIG. 4 may include an example that an m-th mask layer 300_m among the first to the h-th mask layers and an m-th edge loss layer 400_m, corresponding to the m-th mask layer, among the first to the h-th edge loss layers are located corresponding to the n-th deconvolutional layer 200_n, in order to illustrate a detailed process of extracting the edge information and calculating the edge losses based on the example embodiment of FIG. 3.

First, the n-th deconvolutional layer 200_n may acquire the (n+1)-th decoded feature map from its previous deconvolutional layer 200 (n+1) or from its previous element-wise summing layer 300_(m+1). Next, the n-th deconvolutional layer 200_n may generate the n-th original decoded feature map by applying the deconvolution operations to the (n+1)-th decoded feature map and may forward the n-th original decoded feature map to the m-th mask layer 300_m and to an m-th element-wise summing layer 310_m. The m-th mask layer 300_m may generate the m-th edge feature map by extracting edge parts from the n-th original decoded feature map outputted from n-th deconvolutional layer 200_n. The m-th edge feature map may be element-wise added to the n-th original decoded feature map through the m-th element-wise summing layer 310_m, to thereby generate the n-th decoded feature map. The n-th decoded feature map may be transmitted to the next deconvolutional layer 200 (n−1).

Further, the m-th edge loss layer 400_m may generate one or more m-th edge losses by using the n-th edge feature map, outputted from the m-th mask layer 300_m, and its corresponding GT edge or edge parts extracted from its corresponding GT image. The edge losses may be backpropagated and used to adjust the parameters of the CNN. Therefore, the parameters of the CNN may be learned for reinforcing the edge parts and a segmentation result may be outputted with fine edge parts.

Figure 5:
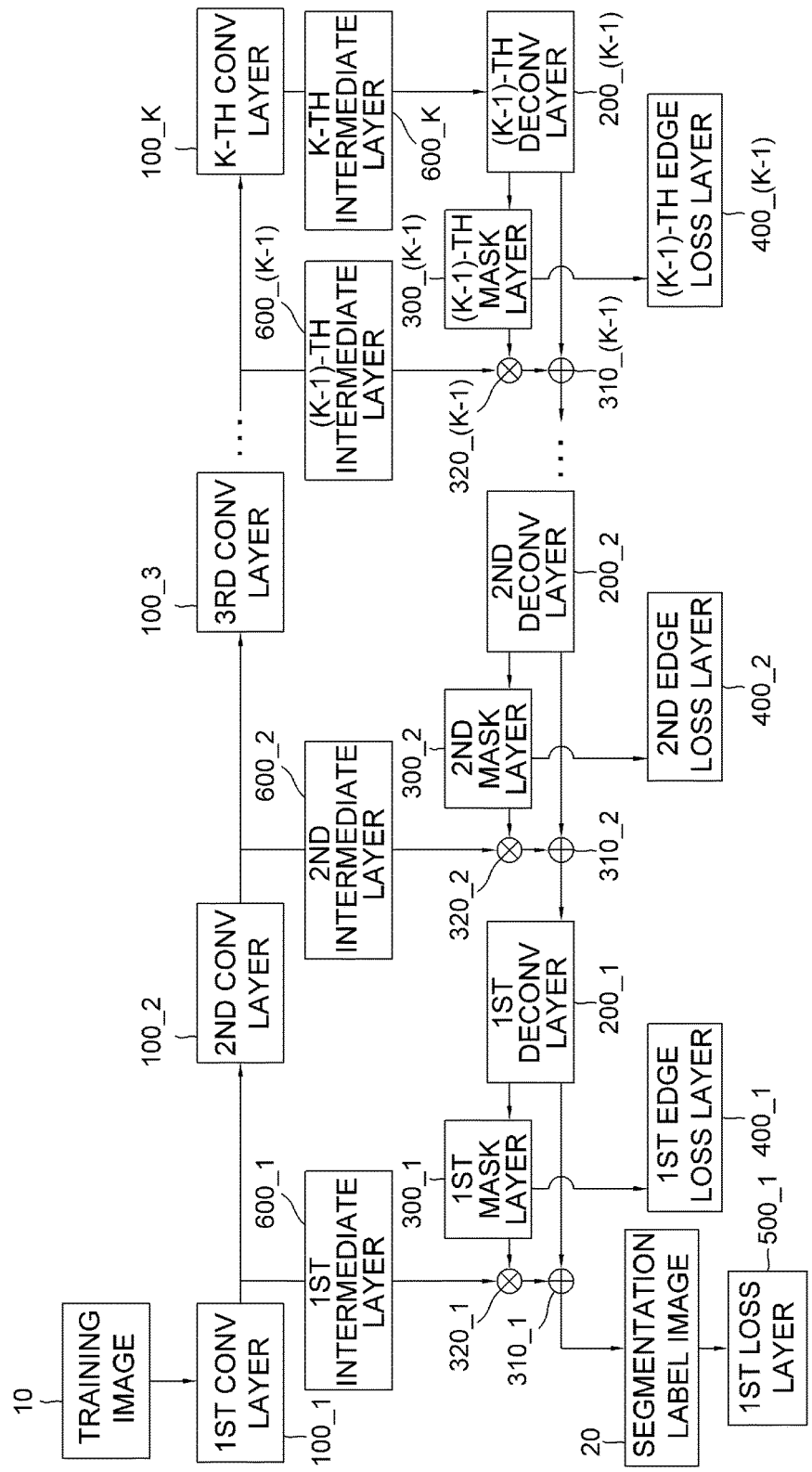
FIG. 5 is a drawing schematically illustrating a process of an image segmentation in accordance with still another example embodiment of the present disclosure.

FIG. 5 is a drawing schematically illustrating a process of an image segmentation in accordance with still another example embodiment of the present disclosure.

The learning device for improving the segmentation performance illustrated in FIG. 5 in accordance with still another example of the present disclosure may have a basically similar configuration to the learning device in FIG. 2 or 3, but may further include intermediate layers between at least one of the convolutional layers and its corresponding deconvolutional layers. For example, the intermediate layers may include a first to a (k−1)-th intermediate layers 600_1 to 600_(k−1) each of which is located between each output end of the first to the (k−1)-th convolutional layers 100_1 to 100_(k−1) and each output end of the first to the (k−1)-th mask layers 300_1 to 300_(k−1) and may further include a k-th intermediate layer 600_k which is located between an output end of the k-th convolutional layer and an input end of the (k−1)-th deconvolutional layer. At least one of the first to the k-th intermediate layers may perform one or more dilated convolution operations. Herein, a receptive field of each of the intermediate layers may be determined according to filter weights having a value of 0. Also, by referring to FIG. 5, the learning device may further include k−1 element-wise product layers, i.e., 320_1 to 320_(k−1), capable of generating a first to a (k−1)-th element-wise products through element-wise multiplying each output from the first to the (k−1)-th intermediate layers and each output from the first to the (k−1)-th mask layers. The first to the (k−1)-th element-wise products may be transmitted to the first to the (k−1)-th element-wise summing layers 310_1 to 310_(k−1) respectively, and the first to the (k−1)-th element-wise summing layers 310_1 to 310_(k−1) may element-wise add each of the first to the (k−1)-th element-wise products and its corresponding original decoded feature map among the k−1 original decoded feature maps, to thereby generate the first to the (k−1)-th decoded feature maps.

As another example, although not illustrated in a drawing, the learning device may include h intermediate layers, each of which is located between each output end of the first to the h-th mask layers and each output end of h convolutional layers corresponding to the first to the h-th mask layers. Also, the learning device may include a first to an h-th element-wise product layers 320_1 to 320_h corresponding to the h mask layers. The first to the h-th element-wise product layers may respectively generate a first to an h-th element-wise products through element-wise multiplying a first to an h-th intermediate feature maps, outputted from the h intermediate layers, and the first to the h-th edge feature maps, outputted from the first to the h-th mask layers 300_1 to 300_h. The first to the h-th element-wise products may be transmitted to a first to an h-th element-wise summing layers 310_1 to 310_h respectively. Next, the first to the h-th element-wise summing layers 310_1 to 310_h may element-wise add each of the first to the h-th element-wise products and its corresponding original decoded feature map among the h original decoded feature maps, to thereby generate h decoded feature maps among the first to the (k−1)-th decoded feature maps.

That is, the learning device (i) may instruct the h intermediate layers to respectively generate the first to the h-th intermediate feature maps by inputting h encoded feature maps thereto which are outputted from h convolutional layers corresponding to the first to the h-th mask layers, (ii) may instruct the first to the h-th mask layers to generate the first to the h-th edge feature maps by extracting edge parts from the h original decoded feature maps each of which is outputted from each of the h deconvolutional layers corresponding to each of the first to the h-th mask layers, and (iii-1) may instruct the first to the h-th element-wise product layer to generate each of a first to an h-th element-wise products through element-wise multiplying each of the first to the h-th intermediate feature maps and its corresponding edge feature map and (iii-2) may instruct the first to the h-th element-wise summing layer to element-wise add each of the first to the h-th element-wise products and its corresponding original decoded feature map among the h original decoded feature maps, to thereby generate the h decoded feature maps among the first to the (k−1)-th decoded feature maps. Further, the learning device may further include an additional (h+1)-th intermediate layer between the output end of the k-th convolutional layer and the input end of the (k−1)-th deconvolutional layer, wherein the additional (h+1)-th intermediate layer may generate an (h+1)-th intermediate feature map by applying one or more intermediate operations to the k-th encoded feature maps and may forward the (h+1)-th intermediate feature map to the (k−1)-th deconvolutional layer. Herein, the intermediate operation may be the dilated convolution operations.

Figure 6:
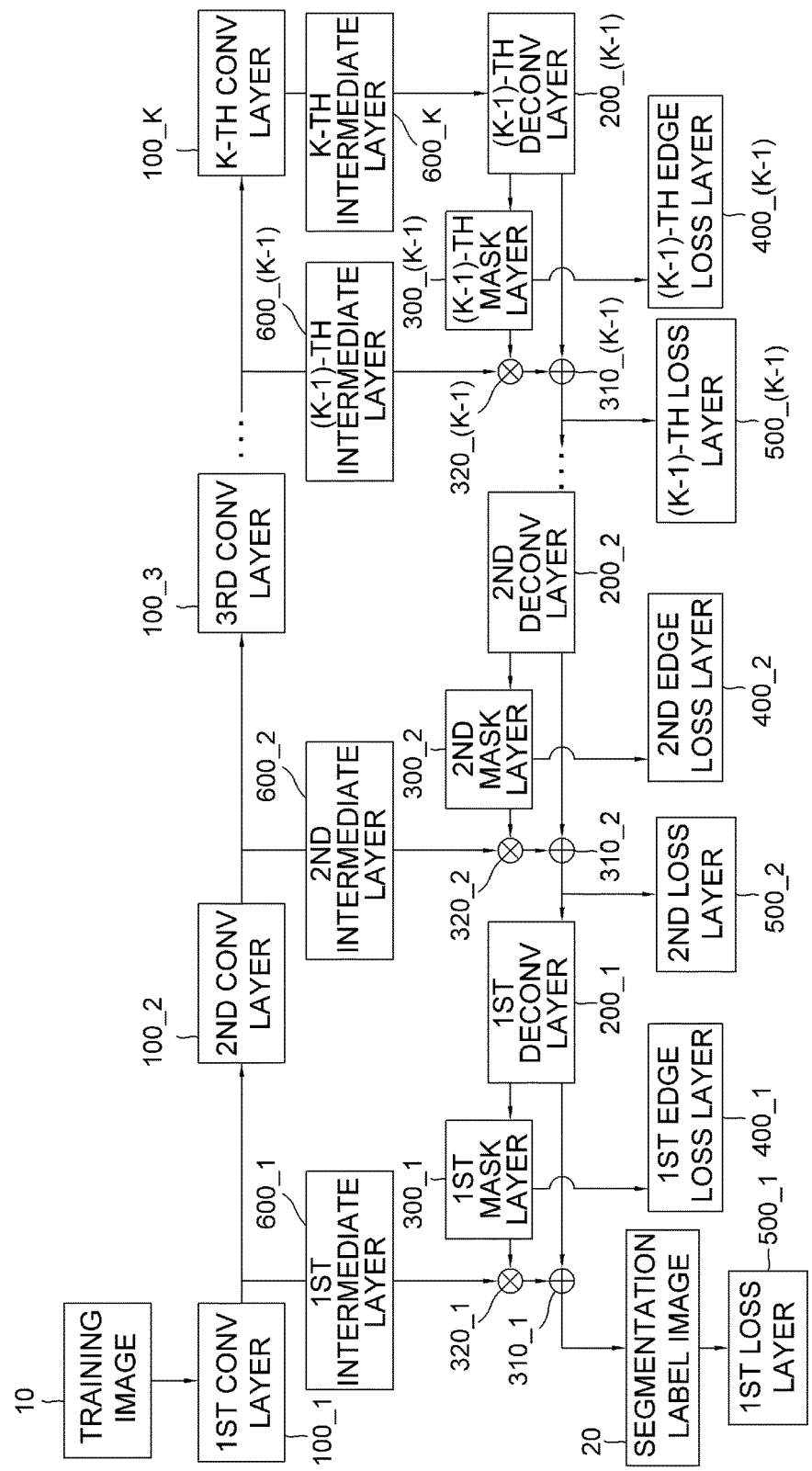
FIG. 6 is a drawing schematically illustrating a process of an image segmentation in accordance with still yet another example embodiment of the present disclosure.

FIG. 6 is a drawing schematically illustrating a process of an image segmentation in accordance with still yet another example embodiment of the present disclosure.

The learning device for improving the segmentation performance illustrated in FIG. 6 in accordance with still yet another example of the present disclosure may have a basically similar configuration to the learning device in FIG. 5, but may include the first to the (k−1)-th loss layers 500_1 to 500_(k−1) located corresponding to the first to the (k−1)-th deconvolutional layers 200_1 to 200_(k−1). The learning device in FIG. 6 may instruct the first to the (k−1)-th loss layers 500_1 to 500_(k−1) to generate the first to a (k−1)-th losses respectively by referring to each of the first to the (k−1)-th decoded feature maps and its corresponding GT image, to thereby adjust parameters of at least part of the first to the (k−1)-th deconvolutional layers and the k-th to the first convolutional layers through backpropagation by using the first to the (k−1)-th losses.

In case of the loss layers, the first loss layer may be located corresponding to the first deconvolutional layer, but the other loss layers may not be located corresponding to all of a second to the (k−1)-th deconvolutional layers 200_2 to 200_(k−1). That is, the learning device may include r loss layers located corresponding to r deconvolutional layers among the first to the (k−1)-th deconvolutional layers, wherein the first loss layer 500_1, located corresponding to the first deconvolutional layer 200_1, among the r loss layers may generate the first losses by referring to the label image 20 and its corresponding GT.

The learning device may instruct the r loss layers to generate r losses respectively referring to each of r decoded feature maps, outputted from the r deconvolutional layers corresponding to the r loss layers, and its corresponding GT image. Then, the learning device may adjust the parameters of at least part of the first to the (k−1)-th deconvolutional layers and the k-th to the first convolutional layers through backpropagation by using at least one of the r losses.

Figure 7:
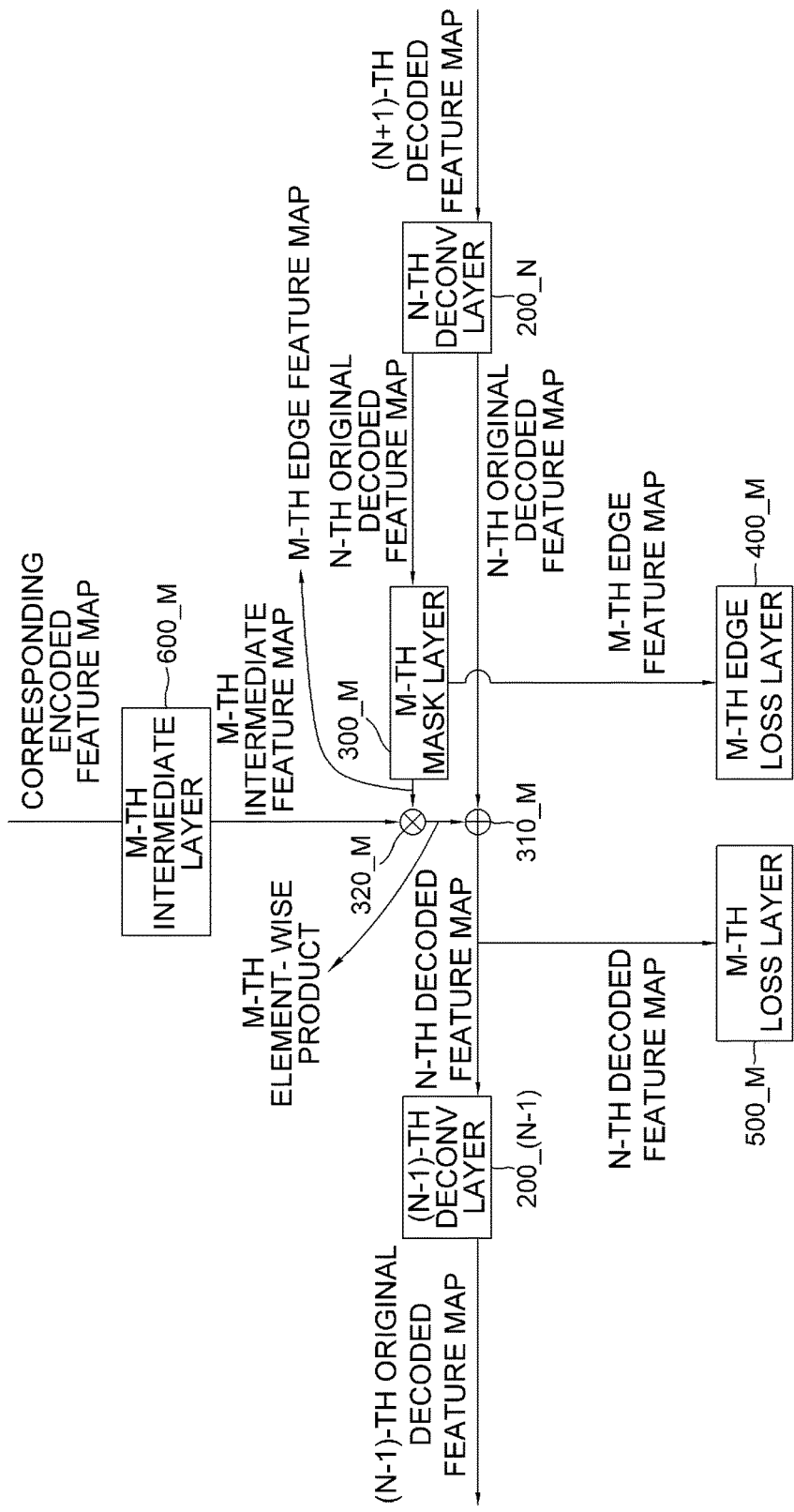
FIG. 7 is a drawing illustrating a detailed process of generating one or more multiple edge losses and one or more multiple losses in the process shown in FIG. 6.

FIG. 7 is a drawing illustrating a detailed process of generating the edge losses and the losses in the process shown in FIG. 6.

By referring to FIG. 7, the learning device may instruct the n-th deconvolutional layer 200_n among the (k−1)-th to the first deconvolutional layers 200_(k−1) to 200_1 to generate the n-th original decoded feature map by applying the deconvolution operations to the (n+1)-th decoded feature map transmitted from its previous deconvolutional layer and to generate the n-th decoded feature map by using the n-th original decoded feature map and the m-th edge feature map extracted from the n-th original decoded feature map. FIG. 7 may include an example that (i) the m-th mask layer 300_m among the first to the h-th mask layers, (ii) the m-th edge loss layer 400_m, corresponding to the m-th mask layer, among the first to the h-th edge loss layers, (iii) an m-th intermediate layer 600_m, and (iv) an m-th loss layer 500_m are shown as corresponding to the n-th deconvolutional layer 200_n, in order to illustrate a detailed process of extracting the edge information and calculating the edge losses based on the example embodiment of FIG. 6.

By referring to FIG. 7, the n-th deconvolutional layer 200_n may acquire the (n+1)-th decoded feature map from its previous deconvolutional layer 200_(n+1) or from its previous element-wise summing layer 300_(m+1). Next, the n-th deconvolutional layer 200_n may generate the n-th original decoded feature map by applying the deconvolution operations to the (n+1)-th decoded feature map and may forward the n-th original decoded feature map to the m-th mask layer 300_m and to the m-th element-wise summing layer 310_m. The m-th mask layer 300_m may generate the m-th edge feature map by extracting edge parts from the n-th original decoded feature map which is outputted from the n-th deconvolutional layer 200_n.

Meanwhile, the m-th intermediate layer 600_m may generate an m-th intermediate feature map by applying the intermediate operations to its corresponding encoded feature map, and then an m-th element-wise product layer 320_m may generate an m-th element-wise product through element-wise multiplying the m-th edge feature map and the m-th intermediate feature map. The m-th element-wise product may be element-wise added to the n-th original decoded feature map through the m-th element-wise summing layer 310_m, to thereby generate the n-th decoded feature map. The n-th decoded feature map may be transmitted to the next deconvolutional layer 200_(n−1).

Further, the m-th edge loss layer 400_m may generate the m-th edge losses by using the n-th edge feature map, outputted from the m-th mask layer 300_m, and its corresponding GT edge or edge parts extracted from its corresponding GT image. Also, the m-th loss layer 500_m may generate one or more m-th losses by using the n-th decoded feature map and its corresponding GT. The generated m-th edge losses and the m-th losses may be backpropagated and used to adjust the parameters of the CNN.

Also, the learning method illustrated in FIGS. 2 to 7 may be applied to a testing method of the CNN. For reference, in the description below, the phrase "for training" is added for terms related to the learning processes, and the phrase "for testing" is added for terms related to testing processes, to avoid possible confusion.

That is, the testing method for a segmentation of at least one test image includes steps of: (a) on condition that, assuming that the learning device includes (i) the first to the k-th convolutional layers, which respectively generate a first to a k-th encoded feature maps for training by applying the convolution operations to at least one feature map corresponding to the training image, (ii) the (k−1)-th to the first deconvolutional layers, which respectively generate a (k−1)-th to a first decoded feature maps for training by applying the deconvolution operations to the k-th encoded feature map for training, (iii) the first to the h-th mask layers respectively corresponding to the h deconvolutional layers among the (k−1) deconvolutional layers, and (iv) the first to the h-th edge loss layers respectively corresponding to the first to the h-th mask layers, and wherein the h is an integer from 1 to (k−1), the learning device (1) has instructed the first to the k-th convolutional layers to generate the first to the k-th encoded feature maps for training, (2) has instructed the (k−1)-th to the first deconvolutional layers to sequentially generate the (k−1)-th to the first decoded feature maps for training, wherein the learning device has instructed the h-th to the first mask layers to (i) generate an h-th to a first edge feature maps for training by extracting edge parts for training from h original decoded feature maps for training each of which is outputted from each of the h deconvolutional layers corresponding to each of the h-th to the first mask layers, and (ii) generate h edge reinforced decoded feature maps for training serving as at least part of the (k−1)-th to the first decoded feature maps for training by referring to the h original decoded feature maps for training and the h-th to the first edge feature maps for training, and (3) has instructed the first to the h-th edge loss layers to generate the first to the h-th edge losses by referring to the edge parts for training and their corresponding GTs, to thereby adjust the parameters of at least part of the first to the (k−1)-th deconvolutional layers and the k-th to the first convolutional layers through backpropagation by using the first to the h-th edge losses; a testing device, if the test image is inputted, instructing the first to the k-th convolutional layers to generate a first to a k-th encoded feature maps for testing; and (b) the testing device instructing the (k−1)-th to the first deconvolutional layers to sequentially generate a (k−1)-th to a first decoded feature maps for testing, wherein the testing device instructs the h-th to the first mask layers to (i) generate an h-th to a first edge feature maps for testing by extracting edge parts for testing from h original decoded feature maps for testing each of which is outputted from each of the h deconvolutional layers corresponding to each of the h-th to the first mask layers, and (ii) generate h edge reinforced decoded feature maps for testing serving as at least part of the (k−1)-th to the first decoded feature maps for testing by referring to the h original decoded feature maps for testing and the h-th to the first edge feature maps for testing.

The edge loss layers or the loss layer may affect learning time, but may not affect testing time since they are not used for testing. Therefore, a desirable result may be obtained regardless of process time.

Thus, the present disclosure using the multiple edge loss layers may have the following effects.

The present disclosure has an effect of generating a label image with accurate edge parts in a process of the segmentation by reinforcing the edge parts through the edge loss layers.

The present disclosure has another effect of outputting a fine label image as a large number of operations are not required to extract the edge information.

The segmentation performance may be improved to be used for detecting events such as a pedestrian event, a vehicle event, a falling event, a fallen event and the like, and to allow a degree of detecting traffic sign, landmark, road marker and the like to be increased.

It would be understood by one of ordinary skill in the art that a transmission and/or a reception of the above-described images such as the training image and the test image can be performed by communication parts of the learning device and the testing device, and processes of the convolution operation, the deconvolution operation, and the loss value operation can be mainly performed by processors of the learning device and the testing device, but the present disclosure is not limited to these examples. In addition, the learning device and the testing device may further include memories capable of storing computer readable instructions for performing the above-described processes. As one example, the processor, the memory, a medium, etc. may be integrated with an integrated processor.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for improving a segmentation performance using a learning device, wherein the learning device includes (i) a first to a k-th convolutional layers, which respectively generate a first to a k-th encoded feature maps by applying one or more convolution operations to at least one feature map corresponding to at least one training image, (ii) a (k−1)-th to a first deconvolutional layers, which respectively generate a (k−1)-th to a first decoded feature maps by applying one or more deconvolution operations to the k-th encoded feature map, (iii) a first to an h-th mask layers respectively corresponding to h deconvolutional layers among the (k−1) deconvolutional layers, and (iv) a first to an h-th edge loss layers respectively corresponding to the first to the h-th mask layers, and wherein the h is an integer from 1 to (k−1), comprising steps of:
   (a) the learning device, if the training image is inputted, instructing the first to the k-th convolutional layers to generate the first to the k-th encoded feature maps;
   (b) the learning device instructing the (k−1)-th to the first deconvolutional layers to sequentially generate the (k−1)-th to the first decoded feature maps, wherein the learning device instructs the h-th to the first mask layers to (i) generate an h-th to a first edge feature maps by extracting edge parts from h original decoded feature maps each of which is outputted from each of the h deconvolutional layers corresponding to each of the h-th to the first mask layers, and (ii) generate h edge reinforced decoded feature maps serving as at least part of the (k−1)-th to the first decoded feature maps by referring to the h original decoded feature maps and the h-th to the first edge feature maps; and
   (c) the learning device instructing the first to the h-th edge loss layers to generate a first to an h-th edge losses by referring to the edge parts and their corresponding GTs (ground truths), to thereby adjust one or more parameters of at least part of the first to the (k−1)-th deconvolutional layers and the k-th to the first convolutional layers through backpropagation by using the first to the h-th edge losses.

2. The learning method of claim 1, wherein the first to the h-th edge loss layers generate the first to the h-th edge losses by calculating differences between the edge parts and their corresponding GTs, wherein the GTs are respectively extracted from a first to an h-th GT images whose sizes correspond respectively to sizes of the first to the h-th edge feature maps.

3. The learning method of claim 1, wherein, at the step of (b), the (k−1)-th to the first deconvolutional layers sequentially generate the (k−1)-th to the first decoded feature maps (i) by element-wise adding each of the h-th to the first edge feature maps and each of the h original decoded feature maps outputted from the h deconvolutional layers corresponding to the h-th to the first mask layers and (ii) by generating k−h original decoded feature maps serving as at least part of the k−1 decoded feature maps via applying the deconvolution operations to feature maps from each previous layer of each of k−h deconvolutional layers, which do not correspond to the h-th to the first mask layers.

4. The learning method of claim 3, wherein the learning device further includes (v) a first to an r-th loss layers located corresponding to r deconvolutional layers among the first to the (k−1)-th deconvolutional layers, and
   wherein the step of (c) includes a step of: (c1) the learning device instructing the first to the r-th loss layers to generate a first to an r-th losses respectively by referring to each of r decoded feature maps, outputted from the r deconvolutional layers corresponding to the first to the r-th loss layers, and its corresponding GT image, to thereby adjust the parameters of at least part of the first to the (k−1)-th deconvolutional layers and the k-th to the first convolutional layers through backpropagation by using the first to the r-th losses.

5. The learning method of claim 4, wherein the first to the r-th loss layers respectively calculate the first to the r-th losses by referring to each of r converted feature maps, generated by applying each of auxiliary convolution operations to each of the r decoded feature maps, and its corresponding GT image, to thereby generate the first to the r-th losses.

6. The learning method of claim 3, wherein the learning device further includes (vi) a first to an h-th intermediate layers each of which is located between each output end of the first to the h-th mask layers and each output end of their corresponding convolutional layers; and
   wherein the step of (b) includes steps of: (b1) the learning device instructing the first to the h-th intermediate layers to generate a first to an h-th intermediate feature maps by inputting h encoded feature maps thereto which are outputted from h convolutional layers corresponding to the first to the h-th mask layers; (b2) the learning device instructing the first to the h-th mask layers to generate the first to the h-th edge feature maps by extracting the edge parts from the h original decoded feature maps each of which is outputted from each of the h deconvolutional layers corresponding to each of the first to the h-th mask layers; and (b3) the learning device (i) instructing a first to an h-th element-wise product layers to generate each of a first to an h-th element-wise products through element-wise multiplying each of the first to the h-th intermediate feature maps and its corresponding edge feature map and (ii) instructing a first to an h-th element-wise summing layers to element-wise add each of the first to the h-th element-wise products and its corresponding original decoded feature map among the h original decoded feature maps, to thereby generate h decoded feature maps among the first to the (k−1)-th decoded feature maps.

7. The learning method of claim 6, wherein the learning device further includes an additional (h+1)-th intermediate layer between an output end of the k-th convolutional layer and an input end of the (k−1)-th deconvolutional layer, and wherein the additional (h+1)-th intermediate layer generates an (h+1)-th intermediate feature map by applying one or more intermediate operations to the k-th encoded feature maps and forwards the (h+1)-th intermediate feature map to the (k−1)-th deconvolutional layer.

8. The learning method of claim 6, wherein at least one of the first to the h-th intermediate layers performs one or more dilated convolution operations.

9. The learning method of claim 6, wherein, at the step of (b2), the learning device instructs at least an m-th mask layer among the first to the h-th mask layers to generate an m-th edge feature map by extracting edge parts from an n-th original decoded feature map outputted from an n-th deconvolutional layer, corresponding to the m-th mask layer, among the k−1 deconvolutional layers, and
wherein, at the step of (b3), the learning device (i) instructs an m-th element-wise product layer to generate an m-th element-wise product through element-wise multiplying the m-th edge feature map and an m-th intermediate feature map, outputted from an m-th intermediate layer corresponding to the m-th mask layer, and (ii) instructs an m-th element-wise summing layer to element-wise add the m-th element-wise product and the n-th original decoded feature map, to generate an n-th decoded feature map.

10. The learning method of claim 9, wherein the learning device further includes (v) a first to an r-th loss layers located corresponding to r deconvolutional layers among the first to the (k−1)-th deconvolutional layers,
wherein the learning device further includes an additional deconvolutional layer capable of receiving the first decoded feature map and outputting an adjusted first decoded feature map, to be inputted to the first loss layer, and
wherein the step of (c) includes a step of: (c1) the learning device instructing the first to the r-th loss layers to generate a first to an r-th losses respectively by referring to each of r decoded feature maps, outputted from the r deconvolutional layers corresponding to the first to the r-th loss layers, and its corresponding GT image, to thereby adjust the parameters of at least part of the first to the (k−1)-th deconvolutional layers and the k-th to the first convolutional layers through backpropagation by using the first to the r-th losses.

11. A testing method for a segmentation of at least one test image comprising steps of:
(a) on condition that, assuming that a learning device includes (i) a first to a k-th convolutional layers, which respectively generate a first to a k-th encoded feature maps for training by applying one or more convolution operations to at least one feature map corresponding to at least one training image, (ii) a (k−1)-th to a first deconvolutional layers, which respectively generate a (k−1)-th to a first decoded feature maps for training by applying one or more deconvolution operations to the k-th encoded feature map for training, (iii) a first to an h-th mask layers respectively corresponding to h deconvolutional layers among the (k−1) deconvolutional layers, and (iv) a first to an h-th edge loss layers respectively corresponding to the first to the h-th mask layers, and wherein the h is an integer from 1 to (k−1), the learning device (1) has instructed the first to the k-th convolutional layers to generate the first to the k-th encoded feature maps for training, (2) has instructed the (k−1)-th to the first deconvolutional layers to sequentially generate the (k−1)-th to the first decoded feature maps for training, wherein the learning device has instructed the h-th to the first mask layers to (i) generate an h-th to a first edge feature maps for training by extracting edge parts for training from h original decoded feature maps for training each of which is outputted from each of the h deconvolutional layers corresponding to each of the h-th to the first mask layers, and (ii) generate h edge reinforced decoded feature maps for training serving as at least part of the (k−1)-th to the first decoded feature maps for training by referring to the h original decoded feature maps for training and the h-th to the first edge feature maps for training, and (3) has instructed the first to the h-th edge loss layers to generate a first to an h-th edge losses by referring to the edge parts for training and their corresponding GTs (ground truths), to thereby adjust one or more parameters of at least part of the first to the (k−1)-th deconvolutional layers and the k-th to the first convolutional layers through backpropagation by using the first to the h-th edge losses; a testing device, if the test image is inputted, instructing the first to the k-th convolutional layers to generate a first to a k-th encoded feature maps for testing; and
(b) the testing device instructing the (k−1)-th to the first deconvolutional layers to sequentially generate a (k−1)-th to a first decoded feature maps for testing, wherein the testing device instructs the h-th to the first mask layers to (i) generate an h-th to a first edge feature maps for testing by extracting edge parts for testing from h original decoded feature maps for testing each of which is outputted from each of the h deconvolutional layers corresponding to each of the h-th to the first mask layers, and (ii) generate h edge reinforced decoded feature maps for testing serving as at least part of the (k−1)-th to the first decoded feature maps for testing by referring to the h original decoded feature maps for testing and the h-th to the first edge feature maps for testing.

12. The testing method of claim 11, wherein, at the step of (b), the (k−1)-th to the first deconvolutional layers sequentially generate the (k−1)-th to the first decoded feature maps for testing (i) by element-wise adding each of the h-th to the first edge feature maps for testing and each of the h original decoded feature maps for testing outputted from the h deconvolutional layers corresponding to the h-th to the first mask layers and (ii) by generating k−h original decoded feature maps for testing serving as at least part of the k−1 decoded feature maps for testing via applying the deconvolution operations to feature maps for testing from each previous layer of each of k−h deconvolutional layers, which do not correspond to the h-th to the first mask layers.

13. The testing method of claim 12, wherein the testing device further includes (vi) a first to an h-th intermediate layers each of which is located between each output end of the first to the h-th mask layers and each output end of their corresponding convolutional layers; and
wherein the step of (b) includes steps of: (b1) the testing device instructing the first to the h-th intermediate layers to generate a first to an h-th intermediate feature maps for testing by inputting h encoded feature maps for testing thereto which are outputted from h convolutional layers corresponding to the first to the h-th mask layers; (b2) the testing device instructing the first to the h-th mask layers to generate the first to the h-th edge feature maps for testing by extracting the edge parts for testing from the h original decoded feature maps for testing each of which is outputted from each of the h deconvolutional layers corresponding to each of the first to the h-th mask layers; and (b3) the testing device (i) instructing a first to an h-th element-wise product layers to generate each of a first to an h-th element-wise products for testing through element-wise multiplying each of the first to the h-th intermediate feature maps for testing and its corresponding edge feature map for testing and (ii) instructing a first to an h-th element-wise summing layers to element-wise add each of the first to the h-th element-wise products for testing and its corresponding original decoded feature map for testing among the h original decoded feature maps for testing, to thereby generate h decoded feature maps for testing among the first to the (k−1)-th decoded feature maps for testing.

14. The testing method of claim 13, wherein the testing device further includes an additional (h+1)-th intermediate layer between an output end of the k-th convolutional layer and an input end of the (k−1)-th deconvolutional layer, and wherein the additional (h+1)-th intermediate layer generates an (h+1)-th intermediate feature map for testing by applying one or more intermediate operations to the k-th encoded feature maps for testing and forwards the (h+1)-th intermediate feature map for testing to the (k−1)-th deconvolutional layer.

15. The testing method of claim 13, wherein, at the step of (b2), the testing device instructs at least an m-th mask layer among the first to the h-th mask layers to generate an m-th edge feature map for testing by extracting edge parts for testing from an n-th original decoded feature map for testing outputted from an n-th deconvolutional layer, corresponding to the m-th mask layer, among the k−1 deconvolutional layers, and wherein, at the step of (b3), the testing device (i) instructs an m-th element-wise product layer to generate an m-th element-wise product for testing through element-wise multiplying the m-th edge feature map for testing and an m-th intermediate feature map for testing, outputted from an m-th intermediate layer corresponding to the m-th mask layer, and (ii) instructs an m-th element-wise summing layer to element-wise add the m-th element-wise product for testing and the n-th original decoded feature map for testing, to generate an n-th decoded feature map for testing.

16. A learning device for improving a segmentation performance, wherein the learning device includes (i) a first to a k-th convolutional layers, which respectively generate a first to a k-th encoded feature maps by applying one or more convolution operations to at least one feature map corresponding to at least one training image, (ii) a (k−1)-th to a first deconvolutional layers, which respectively generate a (k−1)-th to a first decoded feature maps by applying one or more deconvolution operations to the k-th encoded feature map, (iii) a first to an h-th mask layers respectively corresponding to h deconvolutional layers among the (k−1) deconvolutional layers, and (iv) a first to an h-th edge loss layers respectively corresponding to the first to the h-th mask layers, and wherein the h is an integer from 1 to (k−1), comprising:

at least one memory that stores instructions; and
at least one processor configured to execute the instructions to: perform processes of (I) instructing the first to the k-th convolutional layers to generate the first to the k-th encoded feature maps, (II) instructing the (k−1)-th to the first deconvolutional layers to sequentially generate the (k−1)-th to the first decoded feature maps, wherein the processor instructs the h-th to the first mask layers to (i) generate an h-th to a first edge feature maps by extracting edge parts from h original decoded feature maps each of which is outputted from each of the h deconvolutional layers corresponding to each of the h-th to the first mask layers, and (ii) generate h edge reinforced decoded feature maps serving as at least part of the (k−1)-th to the first decoded feature maps by referring to the h original decoded feature maps and the h-th to the first edge feature maps, and (III) instructing the first to the h-th edge loss layers to generate a first to an h-th edge losses by referring to the edge parts and their corresponding GTs (ground truths), to thereby adjust one or more parameters of at least part of the first to the (k−1)-th deconvolutional layers and the k-th to the first convolutional layers through backpropagation by using the first to the h-th edge losses.

17. The learning device of claim 16, wherein the first to the h-th edge loss layers generate the first to the h-th edge losses by calculating differences between the edge parts and their corresponding GTs, wherein the GTs are respectively extracted from a first to an h-th GT images whose sizes correspond respectively to sizes of the first to the h-th edge feature maps.

18. The learning device of claim 16, wherein, at the process of (II), the (k−1)-th to the first deconvolutional layers sequentially generate the (k−1)-th to the first decoded feature maps (i) by element-wise adding each of the h-th to the first edge feature maps and each of the h original decoded feature maps outputted from the h deconvolutional layers corresponding to the h-th to the first mask layers and (ii) by generating k−h original decoded feature maps serving as at least part of the k−1 decoded feature maps via applying the deconvolution operations to feature maps from each previous layer of each of k−h deconvolutional layers, which do not correspond to the h-th to the first mask layers.

19. The learning device of claim 18, wherein the learning device further includes (v) a first to an r-th loss layers located corresponding to r deconvolutional layers among the first to the (k−1)-th deconvolutional layers, and wherein the process of (III) includes a process of: (III-1) the processor instructing the first to the r-th loss layers to generate a first to an r-th losses respectively by referring to each of r decoded feature maps, outputted from the r deconvolutional layers corresponding to the first to the r-th loss layers, and its corresponding GT image, to thereby adjust the parameters of at least part of the first to the (k−1)-th deconvolutional layers and the k-th to the first convolutional layers through backpropagation by using the first to the r-th losses.

20. The learning device of claim 19, wherein the first to the r-th loss layers respectively calculate the first to the r-th losses by referring to each of r converted feature maps, generated by applying each of auxiliary convolution operations to each of the r decoded feature maps, and its corresponding GT image, to thereby generate the first to the r-th losses.

21. The learning device of claim 18, wherein the learning device further includes (vi) a first to an h-th intermediate layers each of which is located between each output end of the first to the h-th mask layers and each output end of their corresponding convolutional layers; and wherein the process of (II) includes processes of: (II-1) the processor instructing the first to the h-th intermediate layers to generate a first to an h-th intermediate feature maps by inputting h encoded feature maps thereto which are outputted from h convolutional layers corresponding to the first to the h-th mask layers; (II-2) the processor instructing the first to the h-th mask layers to generate the first to the h-th edge feature maps by extracting the edge parts from the h original decoded feature maps each of which is outputted from each of the h deconvolutional layers corresponding to each of the first to the h-th mask layers; and (III-3) the processor (i) instructing a first to an h-th element-wise product layers to generate each of a first to an h-th element-wise products through element-wise multiplying each of the first to the h-th intermediate feature maps and its corresponding edge feature map and (ii) instructing a first to an h-th element-wise summing layers to element-wise add each of the first to the h-th element-wise products and its corresponding original decoded feature map among the h original decoded feature maps, to thereby generate h decoded feature maps among the first to the (k−1)-th decoded feature maps.

22. The learning device of claim 21, wherein the learning device further includes an additional (h+1)-th intermediate layer between an output end of the k-th convolutional layer and an input end of the (k−1)-th deconvolutional layer, and wherein the additional (h+1)-th intermediate layer generates an (h+1)-th intermediate feature map by applying one or more intermediate operations to the k-th encoded feature maps and forwards the (h+1)-th intermediate feature map to the (k−1)-th deconvolutional layer.

23. The learning device of claim 21, wherein at least one of the first to the h-th intermediate layers performs one or more dilated convolution operations.

24. The learning device of claim 21, wherein, at the process of (II-2), the processor instructs at least an m-th mask layer among the first to the h-th mask layers to generate an m-th edge feature map by extracting edge parts from an n-th original decoded feature map outputted from an n-th deconvolutional layer, corresponding to the m-th mask layer, among the k−1 deconvolutional layers, and wherein, at the process of (II-3), the processor (i) instructs an m-th element-wise product layer to generate an m-th element-wise product through element-wise multiplying the m-th edge feature map and an m-th intermediate feature map, outputted from an m-th intermediate layer corresponding to the m-th mask layer, and (ii) instructs an m-th element-wise summing layer to element-wise add the m-th element-wise product and the n-th original decoded feature map, to generate an n-th decoded feature map.

25. The learning device of claim 24, wherein the learning device further includes (v) a first to an r-th loss layers located corresponding to r deconvolutional layers among the first to the (k−1)-th deconvolutional layers, wherein the learning device further includes an additional deconvolutional layer capable of receiving the first decoded feature map and outputting an adjusted first decoded feature map, to be inputted to the first loss layer, and wherein the process of (III) includes a process of: (III-1) the processor instructing the first to the r-th loss layers to generate a first to an r-th losses respectively by referring to each of r decoded feature maps, outputted from the r deconvolutional layers corresponding to the first to the r-th loss layers, and its corresponding GT image, to thereby adjust the parameters of at least part of the first to the (k−1)-th deconvolutional layers and the k-th to the first convolutional layers through backpropagation by using the first to the r-th losses.

26. A testing device for a segmentation of at least one test image comprising:

at least one memory that stores instructions; and at least one processor, on condition that, assuming that a learning device includes (i) a first to a k-th convolutional layers, which respectively generate a first to a k-th encoded feature maps for training by applying one or more convolution operations to at least one feature map corresponding to at least one training image, (ii) a (k−1)-th to a first deconvolutional layers, which respectively generate a (k−1)-th to a first decoded feature maps for training by applying one or more deconvolution operations to the k-th encoded feature map for training, (iii) a first to an h-th mask layers respectively corresponding to h deconvolutional layers among the (k−1) deconvolutional layers, and (iv) a first to an h-th edge loss layers respectively corresponding to the first to the h-th mask layers, and wherein the h is an integer from 1 to (k−1), the learning device (1) has instructed the first to the k-th convolutional layers to generate the first to the k-th encoded feature maps for training, (2) has instructed the (k−1)-th to the first deconvolutional layers to sequentially generate the (k−1)-th to the first decoded feature maps for training, wherein the learning device has instructed the h-th to the first mask layers to (i) generate an h-th to a first edge feature maps for training by extracting edge parts for training from h original decoded feature maps for training each of which is outputted from each of the h deconvolutional layers corresponding to each of the h-th to the first mask layers, and (ii) generate h edge reinforced decoded feature maps for training serving as at least part of the (k−1)-th to the first decoded feature maps for training by referring to the h original decoded feature maps for training and the h-th to the first edge feature maps for training, and (3) has instructed the first to the h-th edge loss layers to generate a first to an h-th edge losses by referring to the edge parts for training and their corresponding GTs (ground truths), to thereby adjust one or more parameters of at least part of the first to the (k−1)-th deconvolutional layers and the k-th to the first convolutional layers through backpropagation by using the first to the h-th edge losses; configured to execute the instructions to: perform processes of (I) instructing the first to the k-th convolutional layers to generate a first to a k-th encoded feature maps for testing, and (II) instructing the (k−1)-th to the first deconvolutional layers to sequentially generate a (k−1)-th to a first decoded feature maps for testing, wherein the processor instructs the h-th to the first mask layers to (i) generate an h-th to a first edge feature maps for testing by extracting edge parts for testing from h original decoded feature maps for testing each of which is outputted from each of the h deconvolutional layers corresponding to each of the h-th to the first mask layers, and (ii) generate h edge reinforced decoded feature maps for testing serving as at least part of the (k−1)-th to the first decoded feature maps for testing by referring to the h original decoded feature maps for testing and the h-th to the first edge feature maps for testing.

27. The testing device of claim 26, wherein, at the process of (II), the (k−1)-th to the first deconvolutional layers sequentially generate the (k−1)-th to the first decoded feature maps for testing (i) by element-wise adding each of the h-th to the first edge feature maps for testing and each of the h original decoded feature maps for testing outputted from the h deconvolutional layers corresponding to the h-th to the first mask layers and (ii) by generating k−h original decoded feature maps for testing serving as at least part of the k−1 decoded feature maps for testing via applying the deconvolution operations to feature maps for testing from each previous layer of each of k−h deconvolutional layers, which do not correspond to the h-th to the first mask layers.

28. The testing device of claim 27, wherein the testing device further includes (vi) a first to an h-th intermediate layers each of which is located between each output end of the first to the h-th mask layers and each output end of their corresponding convolutional layers; and wherein the process of (II) includes processes of: (II-1) the processor instructing the first to the h-th intermediate layers to generate a first to an h-th intermediate feature maps for testing by inputting h encoded feature maps for testing thereto which are outputted from h convolutional layers corresponding to the first to the h-th mask layers; (II-2) the processor instructing the first to the h-th mask layers to generate the first to the h-th edge feature maps for testing by extracting the edge parts for testing from the h original decoded feature maps for testing each of which is outputted from each of the h deconvolutional layers corresponding to each of the first to the h-th mask layers; and (II-3) the processor (i) instructing a first to an h-th element-wise product layers to generate each of a first to an h-th element-wise products for testing through element-wise multiplying each of the first to the h-th intermediate feature maps for testing and its corresponding edge feature map for testing and (ii) instructing a first to an h-th element-wise summing layers to element-wise add each of the first to the h-th element-wise products for testing and its corresponding original decoded feature map for testing among the h original decoded feature maps for testing, to thereby generate h decoded feature maps for testing among the first to the (k−1)-th decoded feature maps for testing.

29. The testing device of claim 28, wherein the testing device further includes an additional (h+1)-th intermediate layer between an output end of the k-th convolutional layer and an input end of the (k−1)-th deconvolutional layer, and wherein the additional (h+1)-th intermediate layer generates an (h+1)-th intermediate feature map for testing by applying one or more intermediate operations to the k-th encoded feature maps for testing and forwards the (h+1)-th intermediate feature map for testing to the (k−1)-th deconvolutional layer.

30. The testing device of claim 13, wherein, at the process of (II-2), the processor instructs at least an m-th mask layer among the first to the h-th mask layers to generate an m-th edge feature map for testing by extracting edge parts for testing from an n-th original decoded feature map for testing outputted from an n-th deconvolutional layer, corresponding to the m-th mask layer, among the k−1 deconvolutional layers, and wherein, at the process of (II-3), the processor (i) instructs an m-th element-wise product layer to generate an m-th element-wise product for testing through element-wise multiplying the m-th edge feature map for testing and an m-th intermediate feature map for testing, outputted from an m-th intermediate layer corresponding to the m-th mask layer, and (ii) instructs an m-th element-wise summing layer to element-wise add the m-th element-wise product for testing and the n-th original decoded feature map for testing, to generate an n-th decoded feature map for testing.

* * * * *